(No Model.)
J. L. HORNIG.
FLUID INSPECTOR.
No. 298,469. Patented May 13, 1884.
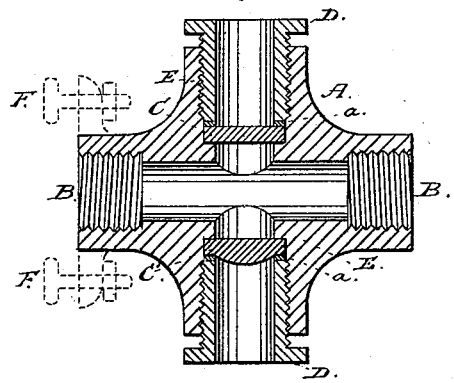
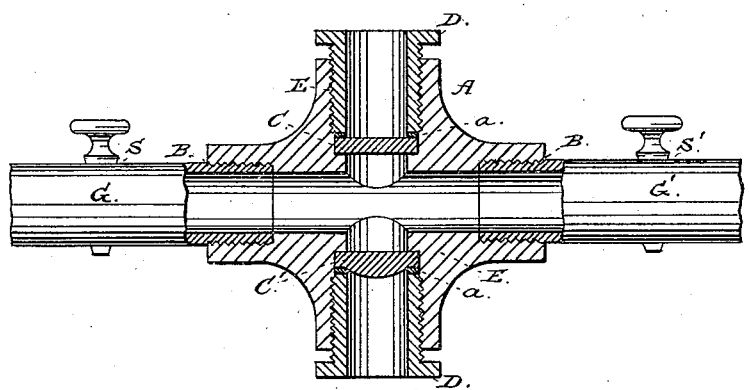
Attest:
F. W. Howard
F. N. Hall
Julius L. Hornig
Inventor;
per Z. F. Miller
Atty

UNITED STATES PATENT OFFICE.

JULIUS L. HORNIG, OF JERSEY CITY, NEW JERSEY.

FLUID-INSPECTOR.

SPECIFICATION forming part of Letters Patent No. 298,469, dated May 13, 1884.

Application filed October 18, 1882. (No model.)

*To all whom it may concern:*

Be it known that I, JULIUS L. HORNIG, of Jersey City, in the county of Hudson and State of New Jersey, have invented a new and useful Improvement in Fluid-Inspectors; and I do hereby declare that the following is a full and exact description of the same, reference being had to the accompanying drawings, and to the letters of reference marked thereon.

In many operations in which there is a flow of liquid it is often desirable to see clearly the color or condition of the liquid, as the color or condition is frequently a good test of the completing or sufficiency of the operation necessitating the flow. For economy and ease of inspection, it is desirable also that this should be done without stopping the flow of the liquid, but that the liquid should be allowed to flow until the proper change in color appears, and there be provision for then and immediately stopping the flow. While these things are desirable, I am not aware that any device has yet been invented which will subserve these ends.

My invention therefore relates to a method and suitable means for determining the color or condition of a liquid in flow without the stoppage of such flow for inspection; and it consists in the method and devices more particularly hereinafter described and claimed.

It is well known that a ray or rays of light will be transmitted through a liquid in flow, provided the rate of flow be not too great. This I have utilized in my method, which consists, briefly stated, in first regulating the flow of the liquid to the rate at which light will readily pass therethrough, and then causing a stream or ray or rays of light to pass therethrough in a direction at or about right angle to the direction of flow. By this method the actual color or appearance of every portion of the liquid can be readily seen and any changes therein instantaneously detected. This method may be carried into practice by many forms of devices. The devices, however, which I have found to be the better adapted therefor are illustrated in the accompanying drawings, in which—

Figure 1 is a section of such device; Fig. 2, a view partly in section and partly in elevation.

A is a cross or four-way pipe similar to those used in making intersecting pipe-connections. It is provided with screw-threaded sockets B B, which are to receive the ends of the pipes through which the liquid flows; or the ends may be formed into flanges F F, as shown in dotted lines, to which may be bolted and secured flanged pipe ends.

E E are the cross-pipe connections, the bottoms of which are formed into seats to receive the inspection-glasses C C', which may be plain glass, as at C, or formed into desired shaped lens, as C'. Instead of glass, any transparent medium capable of withstanding the pressure, heat, or other conditions of the flowing liquid may be used. Into the cross-connections E E the hollow screw-threaded tops or cap-rings D D are screwed, holding the inspection-glasses firmly and tightly in position. Between the bottom of the cap-rings D D and the glasses C C' it is well to interpose the gaskets or rings $a$ $a$, of rubber or other elastic material, so as to make provision for the expansion or contraction of the glasses due to heat or other causes. While these gaskets or rings are here shown as between the top rings and the glass, it is evident that they may be upon the other or upon both sides of the glasses.

In Fig. 2 the flow-pipes G G' are shown in elevation, the inspector A being inserted in any convenient or desirable portion of the flow-pipes. Upon either side of the inspector are located the cocks S S', by which the flow of the liquid through the inspector may be readily regulated. While these cocks are here shown as situated in the pipes G G', it is evident that the flow-tube of the inspector might be lengthened and the cocks placed therein, say, at the points $b$ $b$.

In using the device, supposing the flow to be in the direction of the arrow, Fig. 2, the cock S may be turned partly off, S' being left full open, and the desired rate of flow secured in a stream not filling the inspector-tube, or S may be left open and S' turned partly off to secure the right rate of flow with the inspection-tube filled with the liquid. The right rate of flow being thus secured, the light, passing through the liquid by means of the glasses C C', shows the exact condition or color of the liquid. When the change looked for comes, the cock S can be shut, cutting off, instantaneously the flow. When S is shut off, either glass may be readily removed for cleansing, when necessary, and as readily replaced.

When desired, the light passing through the liquid may be received or focused upon an index-card, I, which may be colored to indicate the exact color, indicating the desired change in the liquid; or the light may be received upon a mirror, M, and reflected to the index-card I, allowing the latter to be placed in the most convenient situation. This method and means will be found useful in all situations where the color of liquids under treatment is a test, and is desired to be inspected, and it will be found extremely useful in the blow-off pipes of steam-boilers. In such, now, the engineer or party in charge has simply to guess when sufficient blowing off has taken place—a practice resulting often in either insufficient or too much blowing off. By this method and means sufficient blowing off may always be had and too much avoided with certainty, the inspector enabling the party in charge to see by the color or condition of the water just when the boiler and pipes have been cleaned, and to stop the flow then, avoiding unnecessary waste of hot water and steam. For the purpose of such inspection it has sometimes been attempted to use glass tubes; but such efforts have been futile, especially in the case of high temperatures or pressures on account of the liability of the tubes to burst or break, the difficulty of replacing them when broken, and the difficulty of cleansing them when unbroken.

In this device the amount of glass used being reduced to a minimum and used in shapes, thick flat plates, lenses, bull's eyes, cones, or balls, (either of which may be used,) insuring the greatest strength, and the glass being well stayed and supported at its edges, any danger of bursting or breaking from ordinary causes is obviated, while the glasses are easily removable and replaceable for cleansing or other purposes.

Having thus described my invention, what I claim is—

1. A fluid-inspector consisting of a pipe or tube through which flows the liquid and apertures upon opposite sides thereof, covered by a transparent medium, so that a stream, ray, or rays of light will pass through the liquid at or about at right angles to its flow, substantially as set forth.

2. The combination, with a cross or four-way pipe intersection, of means for securing thereto the pipes through which the liquid is to flow, transparent media placed in each cross, and means for securing the media therein, substantially as set forth.

3. The combination, with a cross or four-way pipe intersection, of means for securing thereto the pipes through which the liquid is to flow, transparent media placed in each cross-arm, means for securing the media therein, and an elastic packing interposed between the media and its seat.

4. The combination, with a fluid-inspector substantially such as described, of cocks interposed to regulate flow of the liquid through the inspector, substantially as set forth.

This specification signed and witnessed this 26th day of July, 1882.

JULIUS L. HORNIG.

Witnesses:
WM. H. MEADOWCROFT,
H. M. BYLLESBY.